United States Patent [19]

Lockwood

[11] Patent Number: 4,513,198

[45] Date of Patent: Apr. 23, 1985

[54] MECHANICAL COMPUTER ASSEMBLY

[75] Inventor: John C. Lockwood, Atlanta, Ga.

[73] Assignee: Anniston Pump Shop, Inc., Anniston, Ala.

[21] Appl. No.: 583,950

[22] Filed: Feb. 27, 1984

Related U.S. Application Data

[63] Continuation-in-part of Ser. No. 340,856, Jan. 20, 1982, abandoned.

[51] Int. Cl.3 .......................... B67D 5/22; F16H 3/22

[52] U.S. Cl. ................................ 235/61 L; 235/94 R; 74/68; 74/348; 74/681

[58] Field of Search ................ 235/61 L, 61 M, 94 R; 74/61, 68, 348, 354, 681

[56] References Cited

U.S. PATENT DOCUMENTS

| | | | |
|---|---|---|---|
| 3,413,867 | 12/1968 | Hamlin | 235/61 M |
| 3,677,466 | 7/1972 | Soupenne | 235/61 L |
| 3,875,816 | 4/1975 | Wells | 74/348 |
| 4,136,573 | 1/1979 | Smilgys et al. | 74/348 |
| 4,269,078 | 5/1981 | Devanney | 74/348 |
| 4,283,967 | 8/1981 | Smilgys | 74/348 X |

*Primary Examiner*—Benjamin R. Fuller
*Attorney, Agent, or Firm*—Newton, Hopkins & Ormsby

[57] ABSTRACT

Conversion of a conventional volume-price computer for a liquid fuel metering pump to extend the existing range from three place to four place unit price per volume and comprising an auxiliary differential gear train assembly driven from the main output gear of the volume register shaft through a settable variable gear train and a fixed step-up gear train assembly wherein an additional higher unit price per volume of 0, $1, or $2 may be added to the conventional mechanism.

5 Claims, 5 Drawing Figures

MECHANICAL COMPUTER ASSEMBLY

CROSS REFERENCE TO RELATED APPLICATIONS

This is a continuation-in-part of my co-pending application, Ser. No. 340,856, filed Jan. 20, 1982, entitled VARIATOR CONVERSION ASSEMBLY now abandoned.

BACKGROUND OF THE INVENTION

1. Field of the Invention

This invention relates generally to mechanical computers for registering the volume of liquid of fuel dispensed by a metering pump as well as the total price of the delivered fuel resultant from a preselected unit price per volume setting.

2. Description of the Prior Art

Mechanical computer-register devices have long been employed for determining and displaying the amount of fuel delivered from a metering pump together with the cost of the delivered fuel commensurate with the unit price per volume of the fuel.

U.S. Pat. No. 3,413,867 issued to R. B. Hamlin, and U.S. Pat. No. 3,677,466 issued to Henri Soupenne disclose such devices which may be selectively set to compute and display a total cost of delivered fuel with the unit price variable from 00.0 to 99.9 cents per gallon.

Such mechanical computer devices consist basically of three differential gear train assemblies arranged in series. Each individual differential gear train assembly consists of a central input gear, a ring gear driven at a variable, settable ratio from 0 to 9, on each ring gear there being compound planet gears with the first gear of the compound gear engaging the central input gear and the second gear engaging a central output gear. Thus, the output gear speed of each differential assembly is the additive total of the speed of the input gear and the speed of the ring gear. Since the output gear of each differential is also the input gear of the succeeding differential and the settable ratios driving the ring gear of each differential may be made a factor of 10 times the preceeding ring gear drive, then the final output gear of the third differential can represent a mulitplication of 0 to 999 times the speed of the first differential input gear.

The rapidly escalating price of gasoline has obsoleted such a price range and necessitates an expanded capability of such computers to enable the calculation of costs based on unit prices extending into the one and two dollar per gallon range. Since the original mechanisms employed only three separate, settable, variable, take off gear or range arm assemblies, one adjustable for 0 to 0.9 cents per gallon, a second adjustable for 0–9 cents per gallon and the third adjustable for 0–90 cents per gallon, then their totalizing capacities were limited to a maximum price range of 99.9 cents per gallon. In order to convert from a three place to a four place computer, it is necessary to add a fourth differential mechanism.

Prior art U.S. Pat. No. 3,875,816 of Arthur James Wells and U.S. Pat. No. 4,136,573 of Bruno Smilygs et al. disclose conversion means to extend this price range above 99.9 cents per gallon. The present invention discloses an alternate method of achieving this extended price range.

SUMMARY OF THE INVENTION

The present invention provides an additional differential gear train assembly driven by the output shaft of the main computer assembly and adapted to selectively add either 0, $1, or $2 incremental prices to the existing settable 10¢, 1¢, and 0.1¢ gear assemblies.

DESCRIPTION OF THE PREFERRED EMBODIMENTS

Referring now to the detailed drawings, there is shown a mechanical volume price computer 1 consisting of two basic assemblies, i.e., a conventional register head (not shown) to post liquid volume delivered as well as the price of the delivered liquid and a change gear mechanism 3 which may be manually set to compute the total price of the delivered liquid dependent upon a preselected price per unit volume.

Figure 1:
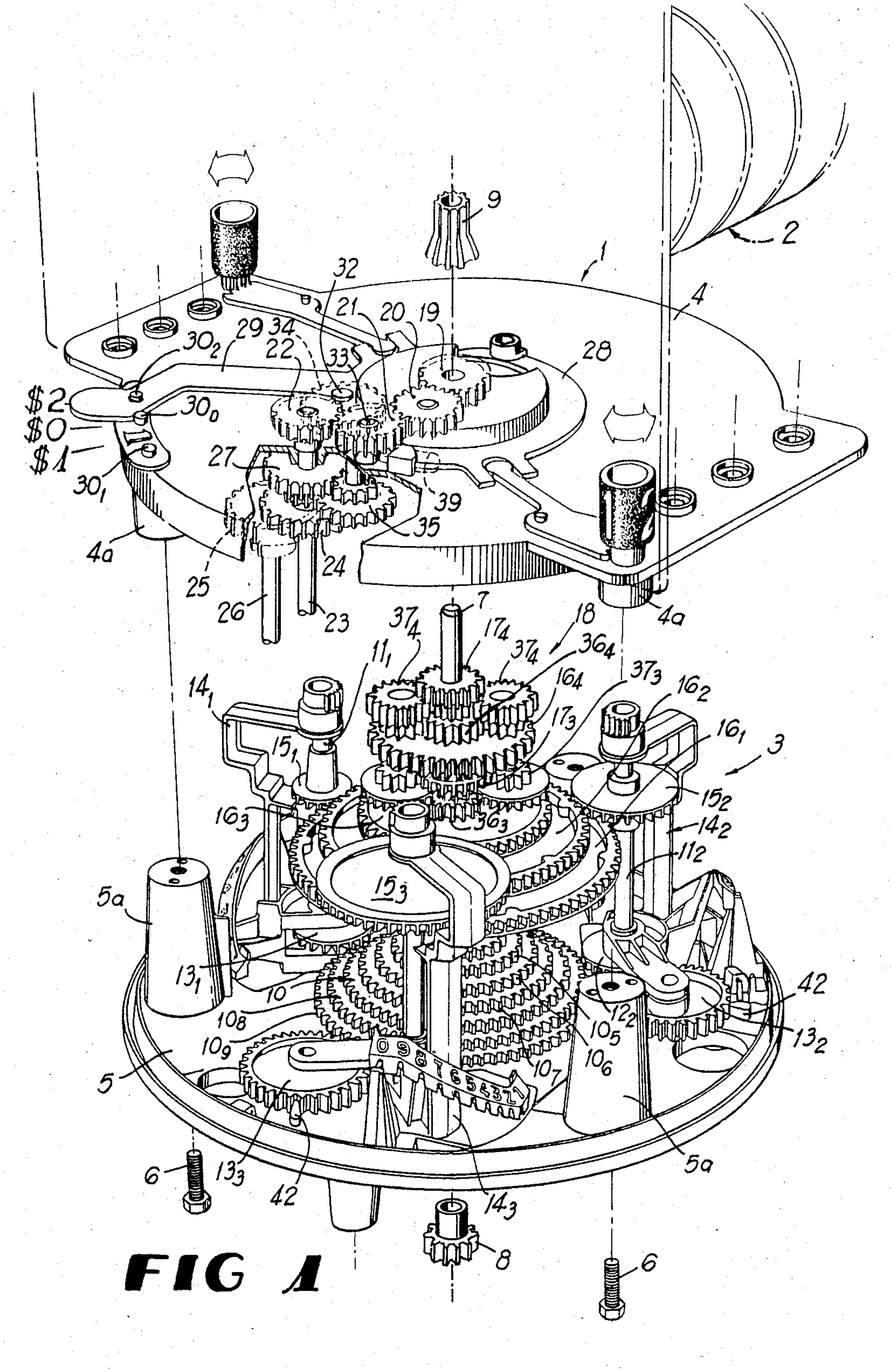
FIG. 1 is an exploded perspective view of the mechanical computer according to the invention.

Referring now to FIG. 1 and considering this change gear mechanism in detail, there is a frame consisting of a top plate 4, and a bottom plate 5, both with extending posts 4*a* and 5*a* and screwed together with attachment screws 6.

Extending through plates 4 and 5 is a main shaft 7 having an input gear 8 driven by a metering pump (not shown) and an output gear 9. Mounted on main shaft 7 and attached hereto is a stepped cone gear 10 spaced between top plate 4 and bottom plate 5. Stepped cone gear 10 consists of nine gears designated as $\mathbf{10}_1$, $\mathbf{10}_2$ - - - $\mathbf{10}_9$ in ascending diameters such that $\mathbf{10}_2$ is twice the diameter of $\mathbf{10}_1$ $\mathbf{10}_3$ is three times the diameter of $\mathbf{10}_1$, and so on up to $\mathbf{10}_9$ which is nine times the diameter of gear $\mathbf{10}_1$. Disposed radially from main shaft 7 are three equally spaced parallel shafts such as shaft $\mathbf{11}_1$ and $\mathbf{11}_2$, each having an axial sliding gear such as gear $\mathbf{12}_2$, keyed to shaft such as shaft $\mathbf{11}_1$ or $\mathbf{11}_2$, and an idler gear such as $\mathbf{13}_1$ or $\mathbf{13}_2$, meshing with sliding gear such as gear $\mathbf{12}_2$, and fixedly spaced therefrom by frame $\mathbf{14}_1$, $\mathbf{14}_2$, or $\mathbf{14}_3$. Each drive gears $\mathbf{15}_1$, $\mathbf{15}_2$, $\mathbf{15}_3$, respectively attached to the upper end of each parallel shaft 11 meshes with individual ring gears $\mathbf{16}_1$, $\mathbf{16}_2$, and $\mathbf{16}_3$ of the planetary carrier of a differential planetary gear train, comprising an input sun gear $\mathbf{36}_3$, compound planetary gears such as gear $\mathbf{37}_3$, and aforementioned ring gear $\mathbf{16}_3$. Each individual shaft such as shaft $\mathbf{11}_1$ or $\mathbf{11}_2$, the associated sliding gear such as gear $\mathbf{12}_2$, idler gear such as gear $\mathbf{13}_1$ or $\mathbf{13}_2$, drive gear such as gear $\mathbf{15}_1$, $\mathbf{15}_2$, or $\mathbf{15}_3$, and frame such as frame $\mathbf{14}_1$, $\mathbf{14}_2$, or $\mathbf{14}_3$, comprise a separate range arm assembly adapted to drive its differential ring gear $\mathbf{16}_1$, $\mathbf{16}_2$, or $\mathbf{16}_3$ at a ratio determined by the particular gear of cone gear 10 engaged with idler gear $\mathbf{13}_3$. The output gear of the first differential planetary gear train assembly is the sun gear to the second differential planetary gear train assembly and the output of the second differential assembly is the input sun gear to the third differential assembly. The diameters of the respective driven gears $\mathbf{15}_1$, $\mathbf{15}_2$, $\mathbf{15}_3$, ring gears $\mathbf{16}_1$, $\mathbf{16}_2$, $\mathbf{16}_3$, and aforementioned planet gears such as gear $\mathbf{37}_3$, $\mathbf{37}_4$, and sun gears such as gear $\mathbf{36}_3$, $\mathbf{36}_4$, is chosen so that the overall ratio of the third gear train from sliding gear such as gear $12_2$, to final output sun gear $17_3$ of the third differential is 10 times or one decade higher than the ratio of sliding gear $12_2$ to final output sun gear $17_3$, which ratio is in turn 10 times or one decade higher than that of sliding gear such as gear $12_2$, to output sun gear $17_3$. Further, if the sliding gears such as gear $12_2$, are axially moved and frames 14 rotated about shafts 11 so that the idler gears 13 are meshed with particular gears of stepped cone gear 10, three settable ratios may be established which are added through the differential gear trains to give a final output ratio at gear $17_3$. For example, if idler gear $13_1$ is meshed with cone gear of gear 10, idler gear $13_2$ is meshed with second cone gear of gear 10 and idler gear $13_3$ meshed with cone gear $10_8$, then the overall ratio of output sun gear $17_3$ to input gear 8 will be $(3\times1)+(2\times10)+(8\times100)$ or 823 to 1, representing 82.3 cents per gallon. Each of idler gears $13_1$, $13_2$, $13_3$, may not only be meshed with any of the nine gears including gears $10_5$, - - - $10_9$ of stepped cone gear 10, but may also be rotated away from the axis of cone gear 10 into engagement with a locking lug 42 on bottom plate 5 so that no rotation of cone gear 10 is imparted to that specific differential ring gear such as gear $16_1$, $16_2$, or $16_3$. Therefore, a metering pump driving input gear 8 may, in conjunction with an odometer assembly in the register head geared to output gear 9, be adapted to read volume in gallons while concurrently a second odometer assembly in the register head geared to output sun gear $17_3$ may record total price of the number of gallons delivered with any preselected price from 0 to 99.9¢ per gallon, depending on the positioning of the three idler gears $13_1$, $13_2$ and $13_3$ on cone gear 10.

Figure 2:
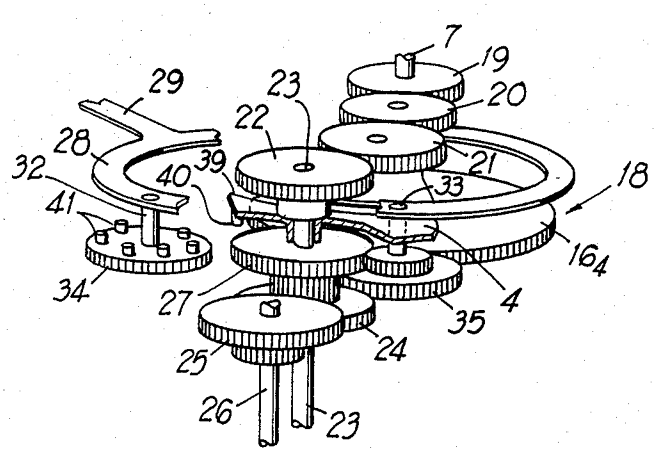
FIG. 2 is a schematic perspective of the upper gear train of FIG. 1.

In accordance with the instant invention the unit price range of the before described computer is expanded from a maximum of 99.9¢ per gallon to $2.99 per gallon in the following manner; as shown in FIGS. 1 and 2.

Figure 3:
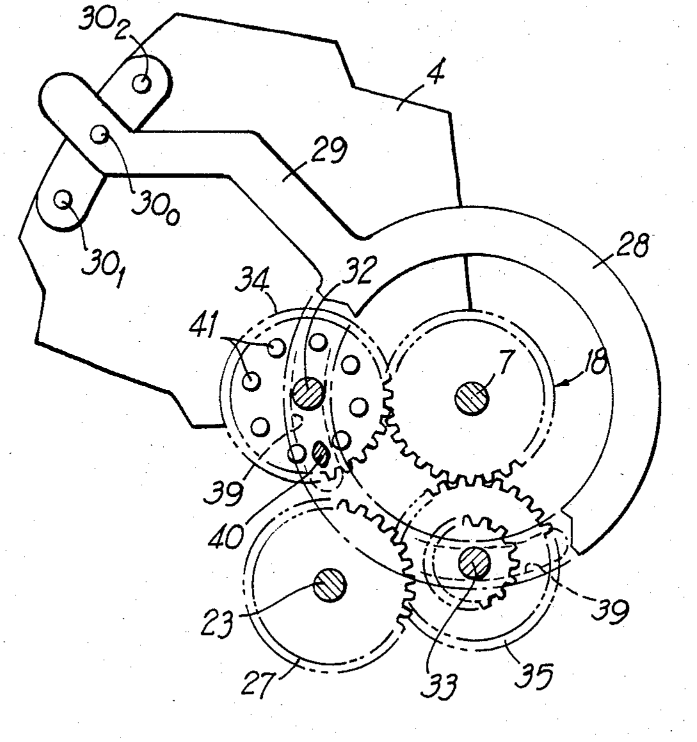
FIG. 3 is a schematic plan view of the upper gear train of FIG. 2 set in the $0 position.
Figure 4:
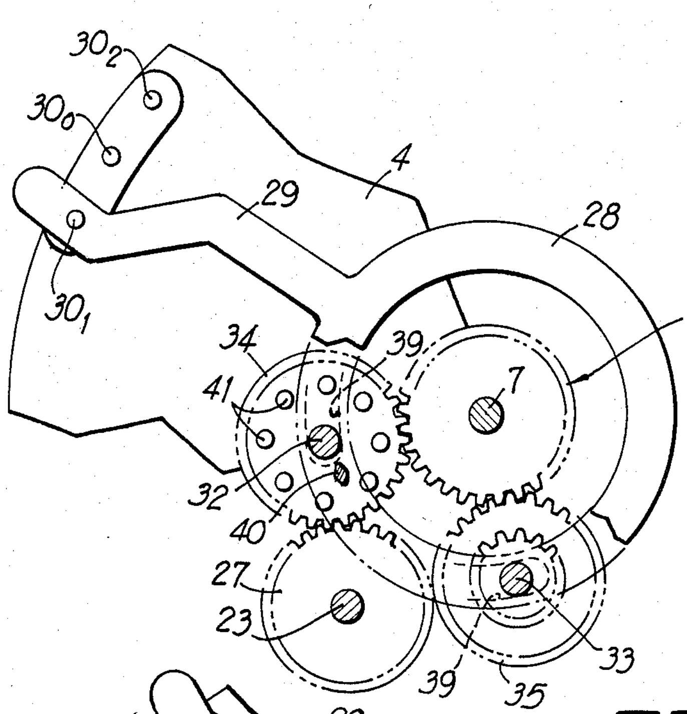
FIG. 4 is a schematic plan view of the upper gear train of FIG. 2 set in the $1 position.
Figure 5:
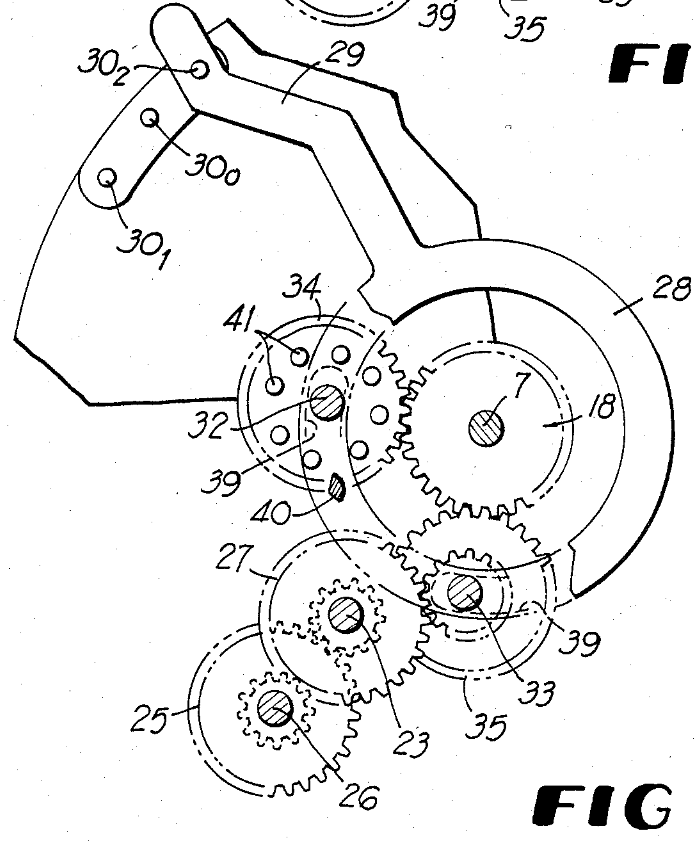
FIG. 5 is a schematic plan view of the upper gear train of FIG. 2 set in the $2 position.

A fourth planetary differential gear train 18 including gear $37_4$ is interposed between the existing third differential (previously the last or 10¢ unit) and the new output sun gear $17_4$ of this added gear train 18. A gear 19 attached to volume output gear 9 now drives two idler gears 20, 21 mounted above the top plate 4. The second idler gear 21 meshes with a gear 22 attached to a first shaft 23 extending through top plate 4 and journalled in bottom plate 5. Attached intermediate the length of shaft 23 is a first gear 24 of a step up gear train. This gear 24 engages the smaller gear of a compound gear 25 mounted on a countershaft 26 which is parallel to shaft 23 and has its upper end journalled in top plate 4 and its lower end journalled in bottom plate 5. The larger gear of compound gear 25 now engages the smaller gear of a second compound gear 27 which is free to independently rotate on first shaft 23 and is spaced between first gear 24 and top plate 4. A lever 28 mounted circumferentially about the housing of added differential unit 18 and above the top plate 4 has an arm 29 extending radially outward and extending beyond the outer edge of top plate 4. Positioning lugs $30_1$, $30_0$ and $30_2$ projecting above the surface of the top plate 4 serve to locate the position of arm 29 as it is moved about the axis of main shaft 7 into any of three radial positions. Depending from the lever 28 are two radially spaced stub shafts 32 and 33 extending downwardly through slot 39 in the top plate 4 and projecting below the lower surface of the top plate 4. On stub shaft 32 there is roatably mounted an idler gear 34 and on stub shaft 33 is rotatably mounted a third compound gear 35. Idler gear 34 further has a circumferential row of equally spaced lugs 41 mounted on the face of gear 34 parallel to shaft 32 and facing towards top plate 4. As shown in FIG. 4, stub shafts 32 and 33 are positioned such that when lever 29 is located on positioning lug $30_1$ in one direction idler gear 34 meshes with the larger second gear of compound gear 27 and with the ring gear of added differential gear 18 at the same time. This establishes a continuous gear train path from main shaft 7 through added differential gear unit 18 to the output sun gear 17. The ratios of first compound gear 25, the second compound gear 27 and the ring gear $16_4$ of added differential gear train 18 is chosen such that rotation of main shaft 7 causes the output sun gear $17_4$ to be driven at a speed effective to represent the additive pricing of $1 per gallon to the cost recorder. Referring to FIG. 5, if now lever arm 29 is radially positioned to the other side on positioning lug $30_2$, idler gear 34 will disengage from the second gear of the second compound gear and the smaller gear of the third compound gear 35 will now engage the larger gear of second compound gear 27 and concurrently the larger gear of the third compound gear 35 will mesh with the ring gear of added differential unit 18. Since the two gears of the third compound are in a 2:1 ratio, the rotational speed of the ring gear of added differential 18 will be twice that of the previous position and will therefore represent an effective additive price of $2 per gallon. Referring now to FIG. 3, when the lever arm 29 is shifted into an intermediate position on positioning lug $30_0$ between the $1 and $2 positions previously described, a fixed tooth 40 depending from top plate 4 engages aforementioned lugs 41 on idler gear 34 and therefore prevents rotation of idler gear 34 and auxiliary added differential unit 18. In this lockout condition, the computer reverts to a three place mechanism.

I claim:

1. In a mechanical computer for registering the volume and price of liquid fuel and having a bottom plate and a top plate fixed in spaced relationship, a main shaft adapted to be driven by a fuel metering pump and projecting below said bottom plate, said main shaft extending through said bottom plate and top plate and projecting above said top plate, an output gear attached to said main shaft above said top plate, a stepped cone gear attached to said main shaft and disposed between said top plate and said bottom plate, a plurality of take-off gear assemblies disposed parallel to said stepped cone gear and radially disposed parallel to said stepped cone gear and radially disposed therefrom, each gear assembly consisting of a rotatable splined shaft journalled in said top plate and said bottom plate, a sliding gear mounted on said splined shaft, an idler gear engaging said sliding gear and adapted for selective engagement with any gear of said stepped cone gear, an output gear on said splined shaft engaging a differential gear mechanism disposed between said stepped cone gear and said top plate and concentric with said main shaft, each of said differential gear mechanisms in interconnected series relationship, successive take-off gear assemblies and differential gear mechanisms being in relative overall decade relationships to the preceding assembly, an output gear concentric with the main shaft and disposed above the said top plate and in engagement with the output of the last of the differential gear mechanism and further adapted to drive a price posting register, the improvement wherein the computer further comprises an auxiliary differential mechanism for establishing a further decade ratio input, said auxiliary differential mechanism being interposed between said last differential gear mechanism and said concentric gear and in operative engagement with each, a gear train consisting of two idler gears mounted on top of and external of the said top plate in engagement with said output gear on said main shaft, a pair of countershafts disposed between said top plate and said bottom plate, one of said countershafts extending through said top plate and having a gear attached thereon engaging said gear train external of said top plate, said countershafts further having interconnected gears mounted thereon disposed between said top plate and said bottom plate to establish a step up ratio, the output gear of said interconnected gears being adapted to drive the said auxiliary differential gear mechanism at an overall ratio of a decade greater than that of the previous last differential gear mechanism.

2. A mechanical computer according to claim 1, further comprising a selector lever mounted on said top plate, concentric to said main shaft and radially positionable thereto, an idler gear mounted on said selector lever and extending downward therefrom and engageable between the output gear of said interconnected countershaft gears and the said auxiliary differential gear mechanism when the selector lever is in a first radial position.

3. A mechanical computer according to claim 2, further comprising a fixed tooth depending from said top plate and depending therefrom and adapted to engage said idler gear when said selector lever is moved to a second radial position such that said idler is disconnected from said output gear of the said interconnected countershaft gears, for locking out said auxiliary differential gear mechanism.

4. A mechanical computer according to claim 3, further comprising a two step compound gear rotatably mounted on a second shaft depending from said selector lever and adapted to engage the output gear of the interconnected countershaft gears and the auxiliary differential gear when the said selector lever is moved to a third radial position such that the auxiliary differential gear is rotated at an overall ratio two decades greater than that of the previous last differential gear mechanism.

5. In a mechanical volume and price computer having an input shaft adapted to be driven by a liquid metering pump and an output shaft with a gear attached thereon for registering the volume of liquid dispensed, a gear concentric with said output shaft for simultaneously recording the price for the said volume of fuel, said price dependent on a settable unit price per volume, said computer having a stepped cone gear attached to said input shaft, a bottom plate below the stepped cone gear, a top plate above the stepped cone gear, a plurality of range arm assemblies disposed radially from and parallel to the stepped cone gear axis, each range arm assembly comprising a rotatable shaft journalled between the top and bottom plates, a sliding gear keyed on said shaft and axially shiftable for selective engagement with one of the stepped cone gears and an output gear on said range arm shaft engaging a main differential gear mechanism concentric with the cone gear shaft and disposed between the top plate and upper gear on the stepped cone gear, said differential gear mechanism additively combining the separate inputs from the range arm output gears to drive the said gear concentric with the output shaft at speed relative to the output shaft speed dependent on the individual range arm settings on the stepped cone gear, the improvement wherein the computer further comprises an auxiliary differential gear mechanism for establishing a higher price range setting interposed between and in operative engagement with both the main differential gear mechanism and the concentric output gear, a gear train consisting of two idler gears mounted on the upper side of the top plate, the first gear of said gear train engaging the output shaft gear, the last gear of said gear train engaging a first gear attached to a first shaft projecting above the top plate and extending to the bottom plate and disposed parallel to the main stepped cone gear and radially offset therefrom, a second gear attached to said first shaft positioned intermediately between the top and bottom plates, a second shaft disposed between top and bottom plates parallel to aid stepped cone gear and radially disposed therefrom, a first compound gear on said second shaft and rotatable thereon, one gear of said first compound gear engaging said intermediate positioned gear on said first shaft and the second gear of said compound gear engaging one gear of a second compound gear mounted on said first shaft between said second gear and the top plate and freely rotatable on said first shaft, the second gear of the second compound gear being selectively coupled to the auxiliary differential gear mechanism through either an idler gear or a third compound gear train, both the idler gear and the third compound gear train being independently rotatable and attached to a shiftable selector lever for alternate engagement between the second compound gear and the auxiliary differential mechanism.

* * * * *